United States Patent [19]

Mink

[11] E Re. 29,797

[45] Reissued Oct. 10, 1978

[54] MATERIAL HANDLING APPARATUS HAVING GRIPPING MEANS FOR MOVING ARTICLES IN SEVERAL DIRECTIONS

[76] Inventor: George Mink, 13130 Geoffrey, Warren, Mich. 48092

[21] Appl. No.: 839,128

[22] Filed: Oct. 3, 1977

Related U.S. Patent Documents

Reissue of:

[64] Patent No.: 4,002,245
Issued: Jan. 11, 1977
Appl. No.: 583,099
Filed: Jun. 2, 1975

U.S. Applications:

[63] Continuation-in-part of Ser. No. 506,113, Sep. 16, 1974, Pat. No. 3,972,422.

[51] Int. Cl.[2] ..... B65G 47/08
[52] U.S. Cl. ..... 214/1 BD
[58] Field of Search ..... 214/1 BD, 1 R, 151, 214/313, 1 BC; 198/479, 403, 40

[56] References Cited

U.S. PATENT DOCUMENTS

| | | | |
|---|---|---|---|
| 2,974,811 | 3/1961 | Dammert et al. | 214/1 BC |
| 3,840,128 | 10/1974 | Swoboda et al. | 214/1 BC |

*Primary Examiner*—Stanley H. Tollberg
*Attorney, Agent, or Firm*—Harness, Dickey & Pierce

[57] ABSTRACT

An improved, low cost material handling apparatus adapted to grip a workpiece and move it from one place to another. The apparatus includes a pair of motion transfer device, each of which is adapted to move a gripping device in a respective direction between first and second extreme positions. A timing mechanism is included that operates the motion transfer device so as to move the workpiece from a home position to a work position. The mechanism also includes device for automatically moving the gripping device between its gripping position and its released position when the workpiece is so transferred. By the addition of certain elements the path of movement of the gripping means may be altered and by a relatively simple adjustment the sequence of operation may be reversed.

8 Claims, 5 Drawing Figures

MATERIAL HANDLING APPARATUS HAVING GRIPPING MEANS FOR MOVING ARTICLES IN SEVERAL DIRECTIONS

Matter enclosed in heavy brackets [ ] appears in the original patent but forms no part of this reissue specification; matter printed in italics indicates the additions made by reissue.

CROSS REFERENCE TO RELATED APPLICATION

This application is a continuation-in-part of my application of the same title, Ser. No. 506,113 filed Sept. 16, 1974 *now issued as U.S. Pat. No. 3,972,422 on Aug. 3, 1976.*

BACKGROUND OF THE INVENTION

This invention relates to a material handling apparatus and more particularly to a simplified, improved material handling apparatus for positioning workpieces or the like.

In many machine operations or other automated operations it is desirable to provide a mechanism that can move a workpiece between two different positions. Such material handling apparatus should be designed so as to permit a lattitude in the sequence of movement, to insure against damage to the workpiece and associated mechanism in the event of jamming and should be relatively low in cost.

It is, therefore, a principal object of this invention to provide an improved, low cost material handling apparatus.

It is another object of the invention to provide a material handling apparatus that is adapted to move workpieces between two different positions and accomplishes this result by a relatively low cost mechanism.

It is a further object of the invention to provide a material handling apparatus that permits a wide lattitude in degrees of movement and in sequence of operation.

SUMMARY OF THE INVENTION

This invention is adapted to be embodied in a material handling apparatus that includes gripping means for releasably restraining a workpiece. Support means are provided for the gripping means. A first motion transfer means is incorporated for moving the support means for movement in a first direction between a first extreme position and a second extreme position. A second motion transfer means is provided for moving the support means in a second direction between a first extreme position and a second extreme position. The second direction is angularly related to the first direction. Timing means operate the motion transfer means so that the supporting means is moved in sequence by the respective motion transfer means from a home position to a work position.

DETAILED DESCRIPTION OF THE PREFERRED EMBODIMENT

Figure 1:
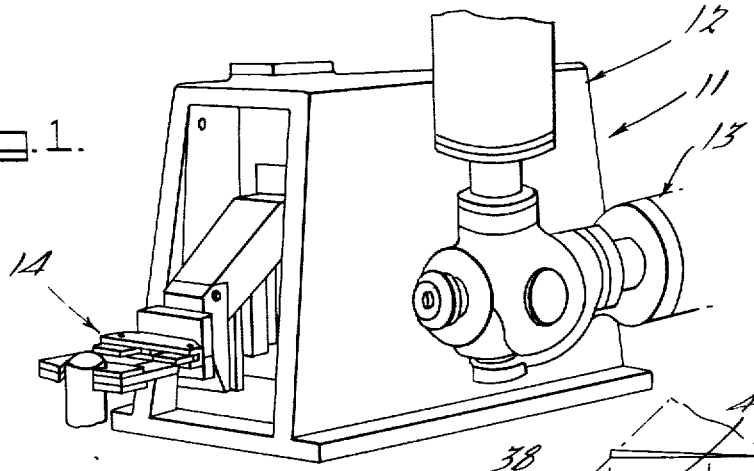
FIG. 1 is a perspective view of a material handling apparatus embodying this invention.

A material handling apparatus embodying this invention is identified generally by the reference numeral 11. The material handling apparatus is adapted to be used with a variety of machine tool or other operations for moving workpieces between respective positions. As examples of applications for this device, the material handling apparatus 11 may be used to pick workpieces from a storage bin and place them onto a transfer table, remove workpieces from a transfer table or machine tool and place them on a conveyor, or move workpieces from one location to another in an assembly operation. Various other applications for the material handling apparatus 11 will present themselves to those skilled in the art.

The material handling apparatus 11 includes an outer housing assembly 12 having an input drive assembly 13. The input drive assembly 13 transfers drive from a suitable power source (not shown) via motion transfer means, to be described, to a gripper assembly, indicated generally be the reference numeral 14.

The gripper assembly 14 includes a pair of gripping jaws 15 and 16 that are pivotally supported by means of pivot pins 17 and 18 upon a supporting member 19. The jaws 15 and 16 provide respective ways 20 that are adapted to afford a detachable and adjustable connection to a respective pair of inserts 21 and 22. In the illustrated embodiment, the inserts 21 and 22 have facing v-shaped surfaces 23 and 24 that are adapted to grippingly engage a workpiece. The inserts 21 and 22 are mounted for longitudinal adjustment on intermediate supporting members 25 and 26 which are, in turn, laterally adjustable along the ways 20 of the jaws 15 and 16.

The jaws 15 and 16 have inwardly projecting lever arm portions 27 and 28 in which arcuate recesses 29 and 31 are formed. Pins 32 and 33 are received in the respective recesses 29 and 31. The pins 32 and 33 are, in turn, affixed to an actuating element 34 which is slidably supported within the supporting member 19. An operating rod 35 is affixed to the member 34 for reciprocating it between an opened position, as shown in the solid line view of FIG. 3 to a closed position in which the jaw inserts 23 and 24 move to the broken line position of this figure.

The supporting member 19 has a cylindrical trunnion portion 36 that is journaled in a complimentary surface of a saddle 37. The saddle 37 is integrally formed with an offset supporting arm 38. A clamping member 39 completes the support of the supporting member 19 and is affixed to the saddle 37, by socket head machine screws 41. Loosening of the machine screws 41 permits rotation of the supporting member 19 within the saddle 37 so that the orientation of the jaws 15 and 16 may be adjusted relative to the remainder of the material handling apparatus 11.

The operating rod 35 has an extending portion 42 that is received within the arm 38. Oppositely facing shoulders, 43 and 44 are formed by enlarged cylindrical portions 45 and 46 of the operating member projection 42. A bifurcated jaw actuating mechanism 47 is received between the shoulders 43 and 44 and is pivotally supported on the arm 38 by means of a pivot pin 48.

Figure 4:
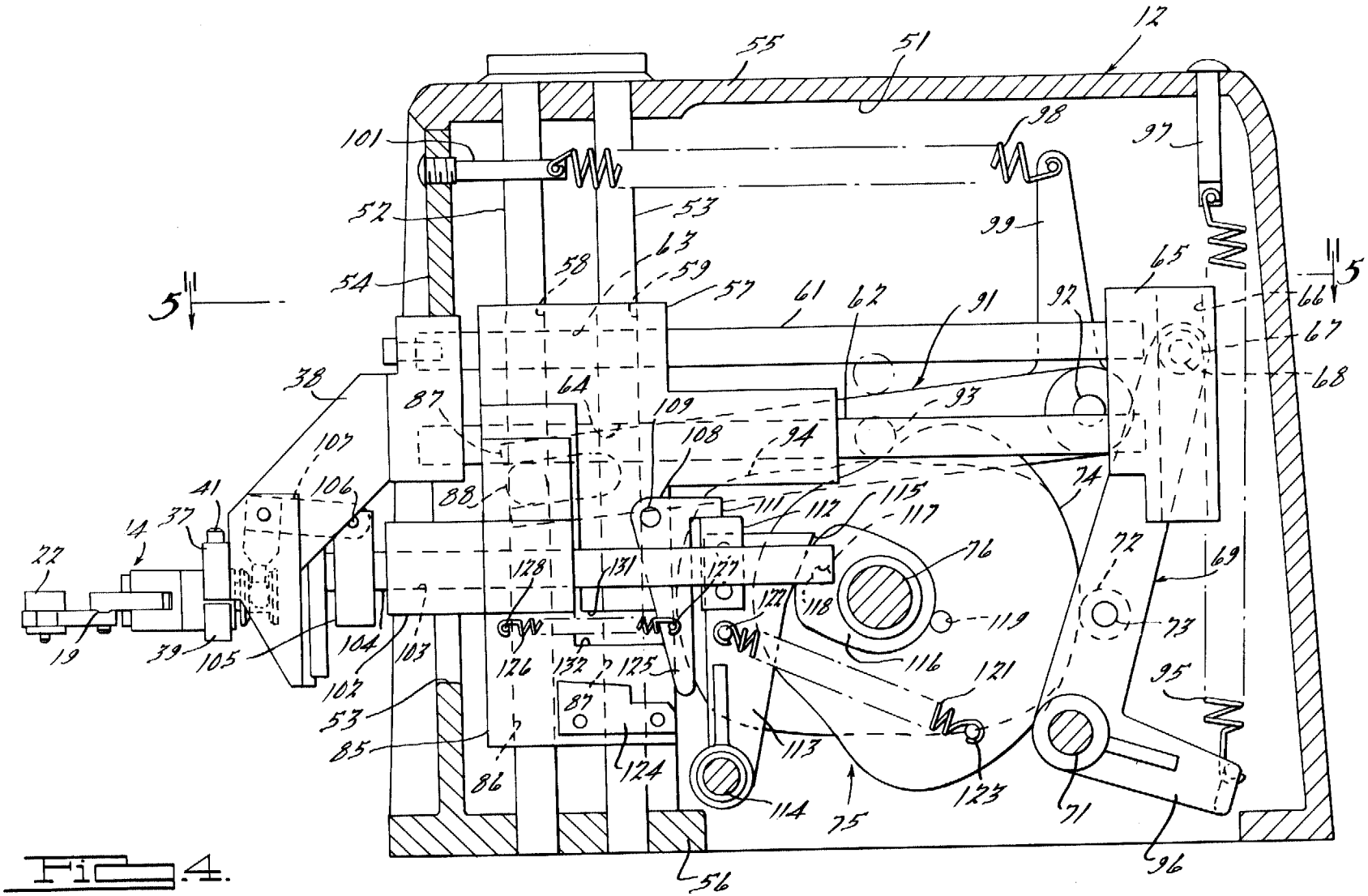
FIG. 4 is an enlarged, cross sectional view taken on a vertical plane through the material handling apparatus shown in FIG. 1.
Figure 5:
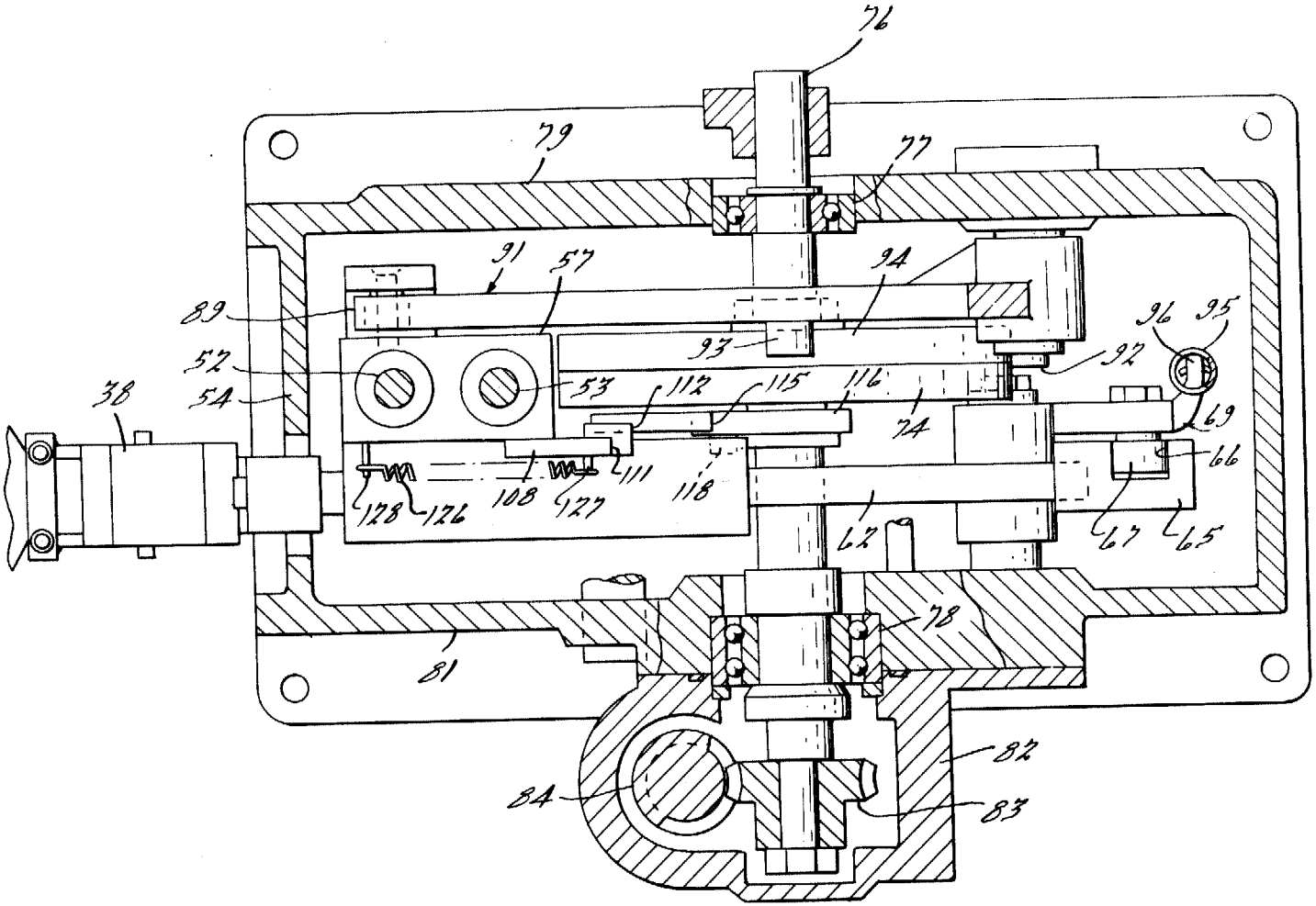
FIG. 5 is a cross sectional view taken along the line 5—5 of FIG. 4.

Referring now in detail to FIGS. 4 and 5, the outer housing 12 defines an enlarged internal cavity 51. A pair of vertically extending supporting rods 52 and 53 are fixed to the forward end of the outer housing 12 adjacent to an opening 50 formed in the forward wall 54 of the outer housing 12. The rods 52 and 53 are affixed in respective cylindrical openings formed in the outer housing upper and lower walls 55 and 56. A first supporting block 57 has a pair of cylindrical bores 58 and 59 for slidably supporting the block 57 on the rods 52 and 53. The block 57 is, therefore, free to move vertically relative to the outer housing 12, and is operated along this plane of movement in a manner to be described.

The supporting arm 38 has affixed to it a pair of guide rods 61 and 62. The guide rods 61 and 62 are slidably supported in cylindrical bores 63 and 64 of the supporting block 57. The arm 38 is, therefore, slidably supported relative to the block 57 for movement in a plane that is perpendicularly disposed to the plane of movement of the block 57.

The inner ends of the rods 61 and 62 are affixed to a follower member 65. The follower member 65 defines a vertically extending way 66 in which a cam member 67 is slidably positioned. The cam member 67 is journaled on a pivot shaft 68 formed at the outer end of a bell crank 69. The bell crank 69 is pivotally supported by the outer housing 12 by means of a supporting pivot shaft 71.

Intermediate its ends, one arm of the bell crank 69 carries a second follower roller 72. The second follower roller 72 is journaled on a supporting shaft 73 and engages a first cam 74 of a timing mechanism, indicated generally by the reference numeral 75. The first cam 74 is affixed, in any known manner, to an input shaft 76 that is journaled by means of antifriction bearings 77 and 78 affixed in side walls 79 and 81 of the outer housing 12. The end of the shaft 76 journaled by the bearing 78 extends into a gear housing 82 affixed, in any known manner, to the housing wall 81. The gear housing 82 forms a portion of the drive mechanism 13. The extending end of the shaft 76 carries a worm wheel 83 that is enmeshed with a driving worm 84 for rotating the shaft 76.

A second block 85 has a pair of vertically extending bores 86 and 87 for slidably supporting this block on the support rods 52 and 53. The block 85 has affixed to it a shaft 88 that is encompassed by a bifurcated end 89 of a second bell crank, indicated generally by the reference numeral 91. The bell crank 91 is pivotally supported on the outer housing wall 79 by means of a pivot pin 92. Intermediate its ends, one arm of the bell crank 91 carries a follower 93 that is engaged with a second timing cam 94 fixed to the shaft 76.

The follower 72 of the first bell crank 69 is urged into engagement with its respective cam 74 by means of a tension spring 95. One end of the tension spring 95 is affixed to a second arm 96 of the bell crank 69. The opposite end of the spring 95 is affixed to a pin 97 that is carried by the top wall 51 of the outer housing 12.

In a like manner, the second bell crank follower 93 is urged into engagement with its respective cam 94 by means of a tension spring 98. One end of the tension spring 98 is affixed to a second arm 99 of the bell crank 91. The opposite end of the spring 98 is connected to a pin 101 that is affixed to the outer housing front wall 54.

The second block 85 has a forwardly extending projection 102 in which a horizontally disposed bore 103 is formed. The bore 103 slidably supports an elongated rod 104 to which is affixed a collar 105. The collar 105 has staked to it a pivot 106. The pivot pin 106 is journaled in an extending arm 107 of the jaw actuating member 45.

A blocking lever 108 is pivotally supported upon the block 57 by means of a pivot pin 109. The blocking lever 108 has a projection 111 that is adapted to engage a resilient stop 112 affixed to a lever 113. The lever 113 is journaled for pivotal movement upon a shaft 114 that is affixed to the outer housing 12. The lever 113 has a follower portion 115 that is adapted to engage a cam 116. The cam 116 is positioned upon the shaft 76 along with the cams 74 and 94. The cam 16 is formed with a bore 117 that is adapted to receive a pin 118. The pin 118 also is adapted to extend into one of the two complimentary holes 119 formed in the cam 74 at spaced 180° locations. As will become apparent, which of the holes 119 the pin 118 and cam 116 are keyed to determines the sequence of gripping and release operation of the gripping jaws 15 and 16.

A tension spring 121 is affixed to a pin 122 carried by the lever 113 for urging its follower portion 115 into engagement with the cam 116. The opposite end of the tension spring 121 is affixed to the outer housing 12 by means of a pin 123.

A generally L-shaped blocking member 124 is affixed to the block 85. The blocking member 108 has an extending arm portion 125 that is adapted to cooperate with the block 124, in a manner to be described. A tension spring 126 is affixed by means of a pin 127 to the blocking member 108 at one of its ends. The opposite end of the spring 126 is connected to the block 85 by means of a pin 128. The spring 126 exerts a clockwise bias on the pivotally supported blocking member 108.

OPERATION

Figure 3:
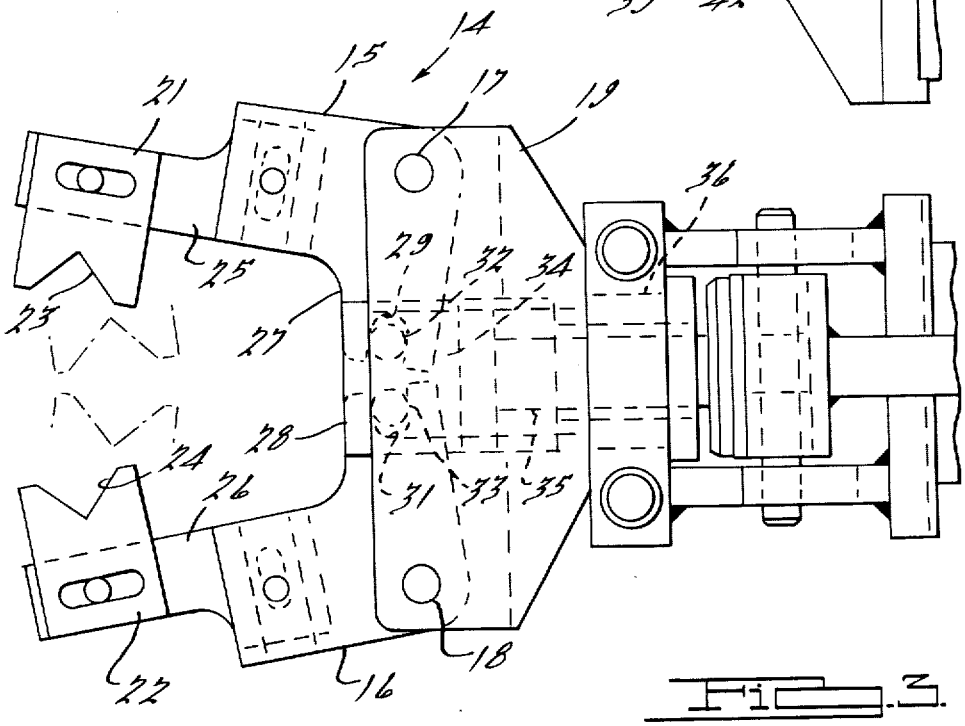
FIG. 3. is a top plan view of the gripping device.

The drawings, except for the dotted line view of FIG. 3, show the material handling apparatus 11 in a home position with the gripping jaws 15 and 16 open. The apparatus 11 is set up in the described embodiment to grip a workpiece in the position shown in the figures, raise it, when viewed in accordance with FIG. 4, along the Y axis, subsequently translateed across the X axis to an extreme position, and subsequently lower it retraversing its movement along the Y axis where the piece is deposited. The gripping jaws then return to the home position as shown in FIG. 4 along the reverse path of movement while remaining in their opened position. The manner in which this motion is achieved will now be described in detail.

Considering specifically FIG. 4, the drive shaft of the respective cam 74, 94 and 116 rotates in a clock-wise direction. In the position shown in FIG. 4, the cam 74 is at a high, dwell position whereas the cam 94 is at a low, dwell position. As the shaft 76 commences its clockwise rotation the bell crank 69 will remain in the position shown in FIG. 4. The follower 93 of the bell crank 91 will, however, reach a lobe on the cam 94 and cause the bell crank 91 to be pivoted in a clock-wise direction about the pivot pin 92.

Figure 2:
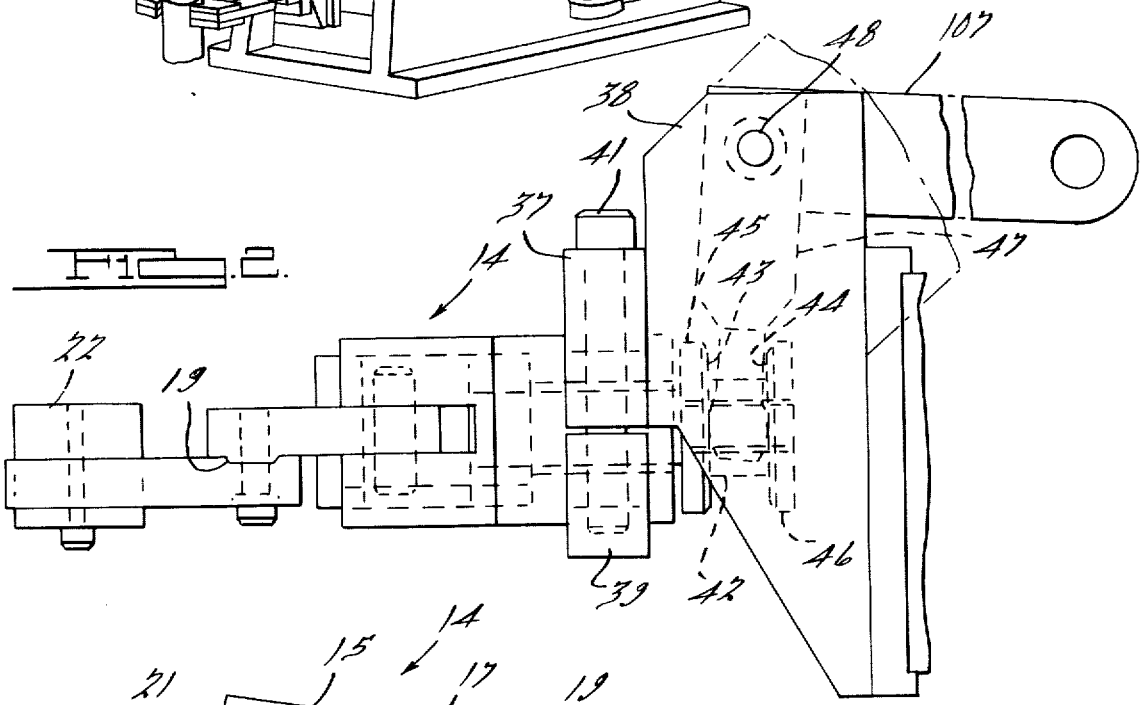
FIG. 2 is a side elevational view of the gripping device of the material handling apparatus shown in FIG. 1.

Initial pivotal movement of the bell crank 91 in a clockwise direction is transmitted from its bifurcated arm 89 to the pin 88 to raise the block 85 away from a stop (not shown) upon which it is rested. The block 57 is also resting against a stop in the FIG. 4 position which stop does not appear in the drawings. There is a gap between abutting surfaces 131 of the block 57 and 132 of the block 85. Therefore, initial upward movement of the block 85 will not be accompanied by any movement of the block 57. The relative movement between these blocks, however, causes a force to be exerted on the jaw actuating member 47 via the pin 106 fixed to the collar 105 carried by the block 85. This movement will cause the jaw actuating member 47 to pivot in the counter-clockwise direction as shown in FIG. 2. This pivotal movement is transmitted to an axially inward force on the operating rod 35 which causes the pins 32 and 33 to move inwardly. This movement of the pins 32 and 33 is transmitted into pivotal movement of the jaws 15 and 16 to cause the inserts 23 and 24 to move together to the dotted line position shown in FIG. 3 to grip the workpiece. Complete closure of the gripping mechanism occurs before the block 85 contacts the block 57.

Upon continued rotation of the shaft 76 the bell crank 91 will be further pivoted and the surface 132 of the block 85 will contact the surface 131 of the block 57 resulting in upward movement of the block 57 along the rods 52 and 53, in the Y axis direction. The gripped workpiece will then be raised until the extreme limit of travel, as determined by the height of the lift on the cam 94. During substantially all of this movement, the cam 74 will have been in its dwell position and the bell crank 69 will not pivot.

It should be noted that the pivoted blocking member 108 was held so that its lever portion 125 was clear of the blocking member 124 by the contact of the pivoted blocking member portion 111 with the stop 112 carried by the lever 113. After the clearance between the surfaces 131 and 132 has been taken up, the block member 124 will be moved sufficiently so as to prevent any pivotal movement of the pivoting blocking member 108.

Continued rotation of the shaft 76 causes the cam 74 to move off of its high portion. The spring 95 therefore, exerts a force on the bell crank 69 to cause it to follow the profile of the cam 74 and pivot in a counter-clockwise direction. This puts a force on the follower members 65 and rods 61 and 62 to cause the support arm 38 to move in the X direction from the home position to an extreme position. During this movement, the jaws 15 and 16 will be retained in their closed position since there is no relative movement between the blocks 57 and 85. During the traverse of the gripping mechanism 14 and gripped workpiece in the X direction, the cam 94 will be at its high, dwell position and no further movement in the Y direction will occur.

When the X direction has been traversed, the cam 74 reaches a lower dwell position and the second lobe on the cam 94 operates on the bell crank 91 in conjunction with the spring 95 to cause pivotal movement in the counter-clockwise direction. The weight of the arm 35 and associated components, therefore, causes the workpiece, gripper mechanism 14 and blocks 57 and 85 to move downwardly along the rods 52 and 53. When the limit of travel in this direction is reached, the block 57 will contact the previously described stop and no further movement will occur. The block 85 will, however, continue to move downwardly and cause a force to be exerted from the collar 105 and pin 106 to the jaw actuating member 47. The member 47 will now be pivoted again in a clockwise direction and cause the jaws 15 and 16 to open so that the workpiece is released from the gripping dies 23 and 24.

At the time that this release of the workpiece is accomplished, the cam 116 will have rotated so that its high point is no longer in contact with the lever follower 115. The spring 121 will, therefore, have caused the lever 113 to pivot so that the stop surface 112 is clear of the pivoted blocking member portion 111.

As the shaft 76 continues to rotate, the block 85 will be raised as previously described by pivotal movement of the bell crank 91 in the clockwise direction. At this point, however, the pivoted blocking member 108 will be moved by the spring 126 into registry with the block 124 to preclude relative movement between the blocks 85 and 57. Since this relative movement is precluded, the jaws 15 and 16 will be retained in their opened or released position. The gripping mechanism 14 is then moved sequentially along the Y axis to the upper extreme limit of travel and then along the X axis to the inner extreme level of travel. Subsequent movement causes the gripping mechanism 14 to be relowered again to the home position as shown in FIG. 4. At this time, the cam 116 will have again returned to the position shown in FIG. 4 and the block 85 will be permitted to move downwardly until it engages its stop while the block 57 is held slightly upwardly by its engagement with its respective stop. The mechanism then is ready for another cycle.

In the described operation the mechanism moves from a home position wherein the gripping mechanism is released, to a gripping position and then to a final delivery position. The path of movement occurs generally first along the Y axis, then along the X axis, and finally along the Y axis. Reverse movement occurs in the opposite sequence. As has been previously noted, it is possible to cause the gripping to occur at the outer position and the release to occur at the inner position by merely rotating the cam 116 from the position shown in FIG. 4 to a position displaced 180° from that position. Upon such reversal, the pivoted blocking member 108 will hold the jaws open in the FIG. 4 position and prevent them from closing until the extreme outer position has been reached. Upon reaching that position, the workpiece will be gripped and the jaws will be retained closed until the home position is again reached. At that point, the jaws will be permitted to open. It is believed that this sequence of operation may be readily understood without further description.

In describing the aforenoted mode of operation it has been assumed that all movement in the X axis occurs before movement in the Y axis is initiated and vice versa. It should be readily understood, however, that merely changing the configuration of the cams 74 and 94 will alter this relationship of movements.

In the illustrated embodiment the cam 94 has two lobes so that reverse movement occurs along the same path as outward movement occurred. By positioning a single lobe on the cam 94, however, movement in the following sequence can occur. The gripping mechanism 14 will be moved from the position shown in FIG. 4 first along the Y axis, secondly along the X axis and finally along the Y axis until the work position is reached. Return movement, however, will occur along the X axis so that the path traversed by the gripping mechanism 14 takes the form of a rectangle. With such a mechanism, the cam 116 pivoted block 108 and block 124 can be deleted.

Certain modifications in the operation of the device possible with the structure described have been previously mentioned. Various other modifications may be made without departing from the invention. For example, rather than using gripping jaws, the relative movement between the blocks 85 and 57 may be used to operate a small vacuum type pump. The gripping mechanism can, therefore, be of the suction type so as to eliminate the necessity for any mechanical engagement. It should also be noted that all movement of the respective elements is caused by springs or gravity. Therefore, it for any reason the gripping mechanism 14 or other components encounter an obstacle, the mechanism will not jam. For example, if a larger than anticipated workpiece is positioned between the jaw dies 23 and 24, no crushing force will be exerted upon the workpiece. The relative movement between the blocks 85 and 57 will just be stopped at an earlier time. Furthermore, if the gripping mechanism 14 or other components engage an obstacle on their outward or downward movement, the respective bell cranks will move free of their respective cam surfaces and no force other than that exerted by the springs 95 and 98 will be placed against the obstacle.

It is to be understood that the foregoing description is that of a preferred embodiment of the invention. Various changes and modifications may be made without departing from the spirit and scope of the invention as defined by the appended claims.

I claim:

[1. A material handling apparatus comprising gripping means for releasably restraining a workpiece, support means for said gripping means, first motion transfer means for moving said supporting means in a first direction between a first extreme position and a second extreme position, second motion transfer means for moving said supporting means in a second direction between a first extreme position and a second extreme position, said second direction being angularly related to said first direction, a single drive means, and timing means operated by said single drive means and operatively coupling said single drive means to said motion transfer means for operating said motion transfer means so that said supporting means is moved in sequence by said motion transfer means from a home position to a work position.]

[2. A material handling apparatus as set forth in claim 1 wherein the gripping means is movable between a gripping position and a released position and further including means for moving said gripping means from one of its positions when said gripping means is in its home position to the other of its positions when said gripping means is moved to its work position.]

[3. A material handling apparatus as set forth in claim 2 further including means for retaining said gripping means in its other position when said gripping means is returned from its work position toward its home position and for returning said gripping means to its one position when said gripping means reaches its home position.]

[4. A material handling apparatus as set forth in claim 1 wherein the first motion transfer means includes a first carriage movable in the first direction and restrained against movement in the second direction.]

[5. A material handling apparatus as set forth in claim 4 wherein the second motion transfer means includes a second carriage supported by the first carriage for movement in the second direction and restrained against movement relative to the first carriage in the first direction.]

[6. A material handling apparatus as set forth in claim 5 wherein the first direction is in the Y-axis and the second direction is in the X-axis.]

[7. A material handling apparatus as set forth in claim 5 wherein the gripping means is movable between a gripping position and a released position and further including means for moving said gripping means from one of its positions when said gripping means is in its home position to the other of its positions when said gripping means is moved to its work position.]

[8. A material handling apparatus as set forth in claim 5 wherein the first motion transfer means further comprises a first cam and motion transmitting means for transmitting motion from saidd first cam to said first carriage, said second motion transfer means comprising a second cam and motion transmitting means for transmitting motion from said second cam to said second carriage.]

[9. A material handling apparatus as set forth in claim 8 wherein said first cam and said second cam are affixed to a common cam shaft said cam shaft comprising said single drive means.]

[10. A material handling apparatus as set forth in claim 9 wherein the first direction is in the Y-axis and the second direction is in the X-axis.]

[11. A material handling apparatus as set forth in claim 8 wherein the motion transmitting means of the first motion transfer means comprises a bellcrank carrying a follower at one end engaging said first cam and spring means for urging said follower into engagement with said first cam.]

[12. A material handling apparatus as set forth in claim 8 wherein the motion transmitting means of the second motion transfer means comprises a bellcrank carrying a follower at one end engaging said second cam and spring means for urging said follower into engagement with said second cam.]

[13. A material handling apparatus as set forth in claim 12 wherein the motion transmitting means of the first motion transfer means comprises a bellcrank carrying a follower at one end engaging said first cam and spring means for urging said follower into engagement with said first cam.]

[14. A material handling apparatus comprising gripping means for releasably restraining a workpiece, support means for said gripping means, first motion transfer means for moving said supporting means in a first direction between a first extreme position and a second extreme position, said first motion transfer means including a first carriage movable in the first direction and restrained against movement in the second direction, a first cam and motion transmitting means for transmitting motion from said first cam to said first carriage, second motion transfer means for moving said supporting means in a second direction between a first extreme position and a second extreme position, said second direction being angularly related to said first direction, said second motion transfer means including a second carriage supported by said first carriage for movement in said second direction and restrained against movement relative to said first carriage in said first direction, a second cam and motion transmitting means for transmitting motion from said second cam to said second carriage, and timing means for operating said motion transfer means so that said supporting means is moved in sequence by said motion transfer means from a home position to a work position.]

[15. A material handling apparatus as set forth in claim 14 wherein said first cam and said second cam are affixed to a common cam shaft.]

[16. A material handling apparatus as set forth in claim 15 wherein the first direction is in the Y-axis and the second direction is in the X-axis.]

[17. A material handling apparatus as set forth in claim 14 wherein the motion transmitting means of the first motion transfer means comprises a bellcrank carrying a follower at one end engaging said first cam and spring means for urging said follower into engagement with said first cam.]

[18. A material handling apparatus as set forth in claim 14 wherein the motion transmitting means of the second motion transfer means comprises a bellcrank carrying a follower at one end engaging said second cam and spring means for urging said follower into engagement with said second cam.]

[19. A material handling apparatus as set forth in claim 18 wherein the motion transmitting means of the first motion transfer means comprises a bellcrank carrying a follower at one end engaging said first cam and spring means for urging said follower into engagement with said first cam.]

20. A material handling apparatus for moving workpieces or the like between a first location and a second location, gripping means, supporting means supporting said gripping means for movement between a gripping position in which a workpiece is gripped and a released position, said supporting means being movable to position said gripping means in said first location and in said second location, first motion transfer means for moving said supporting means in a first direction between a first extreme position and a second extreme position, second motion transfer means for moving said supporting means in a second direction between a first extreme position and a second extreme position, said second direction being angularly related to said first direction, single drive means including an element movable between a first position and a second position, timing means for operating said motion transfer means so that said supporting means is moved in sequence by said motion transfer means from its first location to its second location, said timing means including a lost motion connection operably connecting said drive means element to at least one of said motion transfer means, said lost motion connection being effective to permit movement of said drive means element from a position intermediate its first position and its second position to its first position when said gripping means remains in its first location, actuating means responsive to the movement of said drive means element from its intermediate position to its first position relative to said gripping means for moving said gripping means from one of its positions to the other of its positions, locking means for retaining said gripping means in its other position upon movement of said gripping means from its first location to its second location, and means responsive to the movement of said gripping means to its second location for releasing said locking means and permitting said actuating means to move said gripping means from its other position to its one position.

21. A material handling apparatus as set forth in claim 20 wherein the first motion transfer means includes a first carriage movable in the first direction and restrained against movement in the second direction.

22. A material handling apparatus as set forth in claim 21 wherein the second motion transfer means includes a second carriage supported by the first carriage for movement in the second direction and restrained against movement relative to the first carriage in the first direction.

23. A material handling apparatus as set forth in claim 22 wherein the first direction is in the Y-axis and the second direction is in the X-axis.

*24. A material handling apparatus for moving workpieces or the like between a first location and a second location, gripping means, supporting means supporting said gripping means, said gripping means being movable between a gripping position in which a workpiece is gripped and a released position, said supporting means being movable to position said gripping means in said first location and in said second location, means for moving said supporting means between said locations including a pair of elements defining a lost motion connection, said lost motion connection elements being movable relative to each other between an engaged position and a spaced position, actuating means responsive to movement of said lost motion connection elements from one of their relative positions to the other of their relative positions for moving said gripping means from one of its positions to the other of its positions, locking means for holding said lost motion connection elements in one of their relative positions and said gripping means in one of its positions, and selective positionable cam means for moving said locking means from one of its positions to the other of its positions when said supporting means positions said gripping means in one of said locations.*

*25. A material handling apparatus as set forth in claim 24 further including biasing means for biasing the locking means onto its one position for retaining the gripping means in its one position until the locking means is moved to its other position by the cam means.*

*26. A material handling apparatus as set forth in claim 24 wherein the gripping means is movable in a first sense with one of the lost motion connection elements, said gripping means being supported by said one lost motion connection element for movement relative thereto in a second sense, the means for moving said supporting means between said locations being effective to move said supporting means sequentially in one of said senses and then in the other of said senses.*

*27. A material handling apparatus as set forth in claim 26 wherein the actuating means comprises a bell crank pivotally supported by the supporting means and means for pivoting said bell crank in response to movement of the other of the lost motion connection elements relative to the one lost motion connection element.*

* * * * *